(12) United States Patent
Andersson

(10) Patent No.: US 6,457,617 B1
(45) Date of Patent: Oct. 1, 2002

(54) LOAD CARRIERS FOR VEHICLES

(75) Inventor: Göran Andersson, Borås (SE)

(73) Assignee: Mont Blanc Industri AB (SE)

( * ) Notice: Subject to any disclaimer, the term of this patent is extended or adjusted under 35 U.S.C. 154(b) by 0 days.

(21) Appl. No.: 09/719,845

(22) PCT Filed: Jun. 1, 1999

(86) PCT No.: PCT/SE99/00932

§ 371 (c)(1),
(2), (4) Date: Feb. 6, 2001

(87) PCT Pub. No.: WO00/00367

PCT Pub. Date: Jan. 6, 2000

(30) Foreign Application Priority Data

Jun. 19, 1998 (SE) .............................................. 9802146

(51) Int. Cl.⁷ ............................. B60R 9/04; B60R 9/045
(52) U.S. Cl. ........................ 224/329; 224/321; 224/322
(58) Field of Search ................................ 224/309, 321, 224/322, 329, 330, 331

(56) References Cited

U.S. PATENT DOCUMENTS

| | | | |
|---|---|---|---|
| 5,104,020 A | * | 4/1992 | Arvidsson et al. |
| 5,588,573 A | * | 12/1996 | Mann |
| 5,785,474 A | * | 7/1998 | Kinouchi et al. |
| 5,984,155 A | * | 11/1999 | Stapleton |

FOREIGN PATENT DOCUMENTS

| | | | |
|---|---|---|---|
| EP | 722857 | 7/1996 | ........... B60R/9/058 |
| JP | 406107079 A | * 4/1994 | .................. 224/329 |
| SE | 461837 | 4/1990 | ........... B60R/9/058 |
| WO | 8904775 | 6/1989 | ............. B60R/9/04 |
| WO | 9400315 | 1/1994 | ........... B60R/9/052 |
| WO | 9622901 | 8/1996 | ............. B60R/9/04 |

\* cited by examiner

*Primary Examiner*—Gregory M. Vidovich
(74) *Attorney, Agent, or Firm*—Orum & Roth

(57) ABSTRACT

The invention relates to a load carrier for vehicles, comprising a load carrier bar which extends over the exterior of a vehicle, and support members which extend between the load carrier bay and the vehicle and which are releasably mountable on the vehicle and the load carrier bar with the aid of clamping devices which extend from each support member for engagement with the load carrier bar. The load carrier according to the invention is mainly characterized in that the support members are pivotable in relation to the load carrier bar and have locking devices, which are dependent on the pivot position of the support members and co-operate with the clamping devices and which are adapted to keep the support member and the load carrier bar clamped together in a first pivot position, a load-carrying position, of the support member with the aid of clamping devices, and to neutralize the clamping force produced by the clamping devices against the load carrier bar when changing to a second pivot position, a release position, with a view allowing a displacement/adjustment of the position of the support member along the load carrier bar.

12 Claims, 2 Drawing Sheets

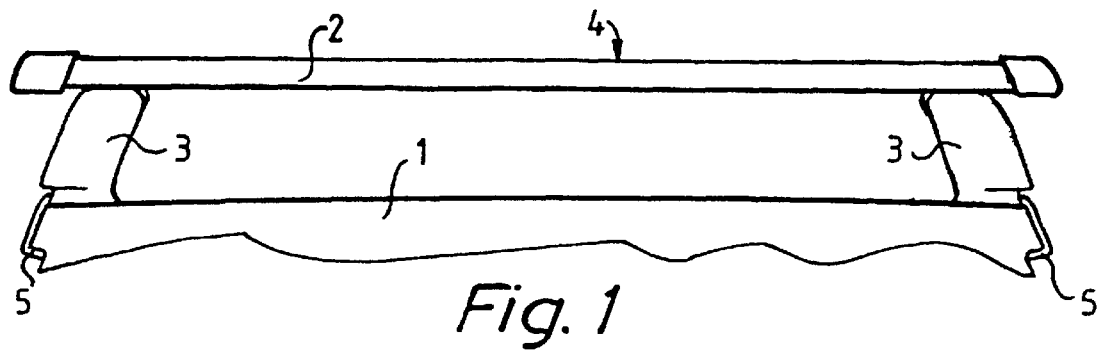
Fig. 1
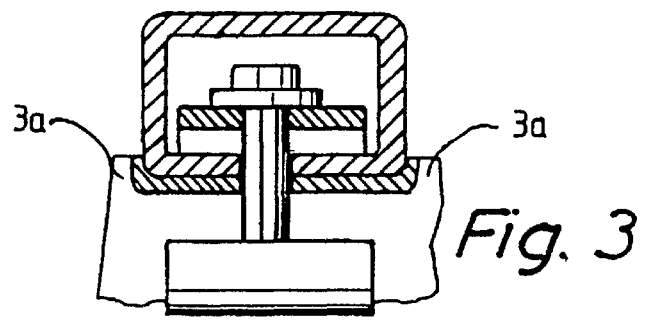
Fig. 3
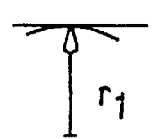 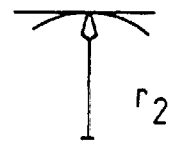 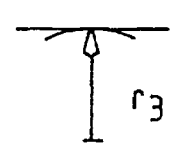
Fig 4a     Fig 4b     Fig. 4c

LOAD CARRIERS FOR VEHICLES

BACKGROUND OF THE INVENTION

Field of the Invention

The present invention relates to a load carrier for vehicles, comprising a load carrier bar which extends over the exterior of a vehicle, and support members which extend between the load carrier bar and the vehicle and which are releasably mountable on the load carrier bar with the aid of clamping devices which extend from each support member for engagement with the load carrier bar.

The main object of the invention is to provide a reliable fitting of the support member to the load carrier bar, said fitting having a simple structure and thus being advantageous from an economical point of view, while being easy to handle when attaching the support member to the load carrier bar and when adjusting the same along the load carrier bar to adapt the load carrier to the vehicle in question.

SUMMARY OF THE INVENTION

The above-mentioned object is achieved by means of an inventive load carrier which is primarily characterised in that said support members are pivotable in relation to the load carrier bar, preferably in a plane extending in the longitudinal direction of the load carrier bar, and have locking devices which are dependent on the pivot position of the support members and co-operate with the clamping devices and which are adapted to keep the support member and the load carrier bar clamped together in a first pivot position, a load-carrying position, of the support member with the aid of the clamping devices, and to neutralise the clamping force produced by the clamping means against the load carrier bar when changing to a second pivot position, a release position, with a view to allowing a displacement/adjustment of the position of the support member along the load carrier bar. By means of this design, in which the support member itself is pivoted in relation to the load carrier bar, a simple release and attachment of the support member to the load carrier bar is possible with the aid of simple and firm manipulations, in which the person who handles the equipment can grip the support member firmly from its outside and pivot the support member in relation to the load carrier bar, thereby avoiding complicated operations via sensitive power transmission links arranged in the support member.

BRIEF DESCRIPTION OF THE DRAWINGS

An embodiment of the invention will be described below with reference to the accompanying drawings, in which:

FIG. 1 is a schematic view of a load carrier extending over a portion of a vehicle;

FIG. 3 is a cross-sectional view of the load carrier bar with the devices for fitting the support member to the same; and FIGS. 4a–4c are schematic views showing the engagement between the support member and the load carrier bar in various angular positions of the support member which are indicated in FIG. 1.

DETAILED DESCRIPTION

Figure 2:
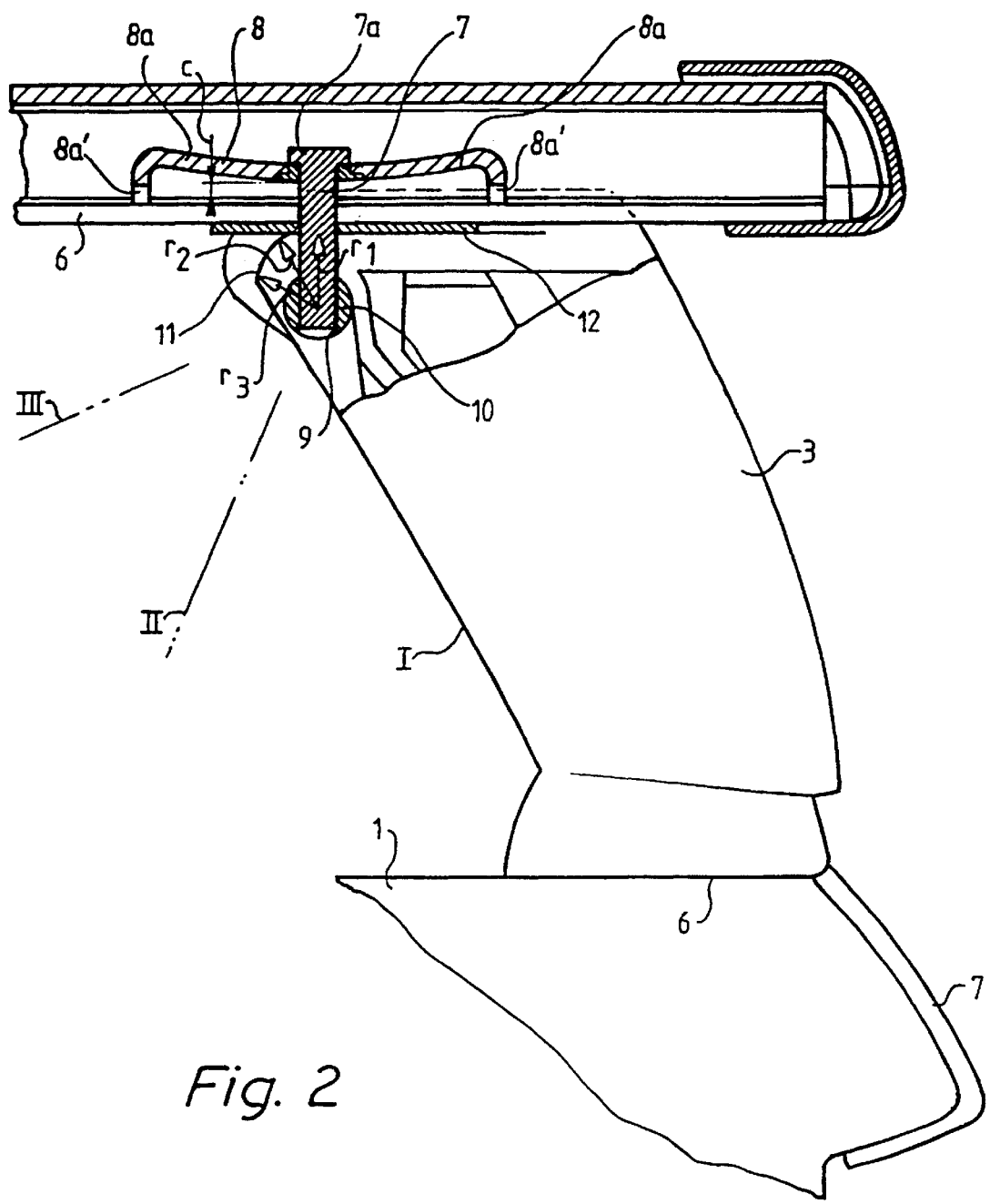
FIG. 2 is a view on a larger scale, partially in section, of one end portion of the load carrier shown in FIG. 1.

The load carrier shown in FIG. 1 comprises a load carrier bar 2 extending over a portion of the exterior of a vehicle 1 and support members extending from the end portions of the load carrier bar to the vehicle body 1 are designated 3. The load carrier in its entirety is designated 4. Moreover, reference numeral 5 refers to gripping elements which are arranged to engage with edge portions of the vehicle body 1. The shown portion of the vehicle body can, for instance, be its top and the gripping elements engage top edge portions along the sides of the vehicle, for instance, adjacent to the door cutouts of the vehicle. Since it is possible to vary the attachment of the support members to the vehicle in many ways which are well known to the one skilled in the art and not important to the description of the invention, this will not be described here in more detail. The illustrated fixing of the support members to the vehicle body is thus only a schematically shown example where the support members have a support surface 6 abutting against the vehicle top and a hook-shaped gripping means 7, which is actuatable with the aid of suitable clamping devices (not shown) in connection with the support member and which engages an edge portion of the vehicle top 1.

In the embodiment shown, the load carrier bar 2 is formed as a hollow section having a substantially rectangular cross-section. At least on one side, the load carrier bar has in the lower wall of the hollow section a slot aperture 6 extending along the load carrier bar. Reference numeral 7 refers to a connecting rod having an enlarged head 7a which is positioned in the hollow section and which abuts against a central part of a substantially yoke-shaped spring means 8, of which one leg 8a projects from the connecting rod 7 on each side of the same in the direction of the hollow section. Furthermore, the legs of the spring means have at their ends bent end portions 8a ' which abut against the inside of the hollow section with their terminal edges and form spacer means, which results in the central portion of the spring means being kept at a distance c from the inside of the inner wall of the load carrier section at least when the spring means is not under tension. The connecting rod 7 extends downwards out of the slot aperture 6 and is screwed, with a threaded end portion, into a threaded boring 9 extending through a pivot pin 10 which is turnably mounted in the support member 3. The boring 9 is thus made in the transverse direction of the pivot pin 10. Reference numeral 11 refers to a support surface which is formed eccentrically with the centre of the pivot pin 10 and which abuts against the underside of the hollow section, in the shown embodiment via a spacer plate 12. Reference symbols $r^1$–$r^3$ refer to the radius extending between the centre of the pivot pin 10 and three different locations on the eccentric-like part of the support surface of the support member 3 facing the load carrier bar. In the embodiment shown in FIG. 2, the support member 3 extends downwards and obliquely outwards to the longitudinal side of the vehicle and has a support surface which is facing the load carrier bar and which extends in the same longitudinal direction as the load carrier bar, thus forming an abutment which counteracts a pivoting movement outwards of the support member in relation to the load carrier bar beyond the shown position. The pivot position of the support member which is indicated in FIG. 3 by full lines corresponds to the normal position when using the load carrier on the vehicle, i.e. the normal state for carrying a load. The tension of the spring 8 is adjustable by turning the threaded connecting rod 7 in the threaded hole of the pivot pin 10. As a result, the deflection of the spring means 8 towards the inside of the hollow section can be adjusted. Thus the abutment force between the support member and the load carrier bar, which is necessary to keep the support member firmly attached to the load carrier bar, can be adjusted in a simple manner. Preferably, this is carried out in advance at the factory. In the position of the support member indicated by full lines, the radius $r^1$ is directed perpendicularly to the load carrier bar. In the pivot position, indicated by III in FIG. 2, in relation to the load carrier bar, the radius $r^3$ is, as is best seen in FIG. 4c, perpendicular to the load carrier bar, and in a position in between the radius $r^2$ is, as indicated in FIG. 4b, perpendicular to the load carrier bar. Suitably, the radii $r^1$ and $r^3$ are related to each other in such manner that the spring means 8 only lightly abuts against the inside of the hollow section or the abutment has ceased in the position indicated with III and in the inwardly pivoted state of the support member 3. Suitably, the radius $r^2$ is greater than the other two radii, which results in a crest-like portion being formed which must be passed by the support member when pivoting between its position I and its position III. This implies that the pivoting of the support member from the position I towards the release position III must take place while overcoming a certain resistance caused by the spring means 8. However, the difference in radius should not exceed the distance c between the spring means and the inside of the hollow section, since this would constitute an obstacle when passing the position II in which the crest portion of the eccentric-like support surface abuts against the load carrier bar.

Suitably, the end portions 8a' of the spring means are somewhat tapered at their terminal edges abutting against the hollow section and/or provided with a suitable friction-increasing surface structure and/or provided with suitable friction-increasing outer layers.

In the position I of the support member 3 shown in FIG. 2, the support member is firmly attached to the load carrier bar. A limited pivoting of the load carrier bar is, however, possible in relation to the support member, i.e. a limited deflection of the central portion of the load carrier bar is allowed. The load carrier bar then performs a rolling-off movement against the eccentric-shaped support surface of the support member. By the point of support being displaced to the left in FIG. 2 away from the centre of the connecting rod 7, the spring means 8 will be deflected by the connecting rod 7 towards the inside of the hollow section, thus reducing the distance c. This pivoting in relation to the support member is, however, only allowed until the distance c is eliminated, after which the spring means portion connecting with the connecting rod and abutting against the inside of the hollow section prevents any further mutual pivoting movement. When further increasing the load exerted on the load carrier bar in the portion located between the support members, an additional deflection thereof will be counteracted by a greater force. The permissible deflection of the load carrier bar and thus the permissible spring action of the same in relation to the support member can be adjusted by selecting a suitable screwed-in position of the connecting rod in the pivot pin 10 and thus a suitable distance c.

When the support member 3 has been pivoted to the pivot position III, its displacement position in the longitudinal direction of the load carrier bar can thus be adjusted and fixed when pivoting the support member to its pivot position I, the load-receiving position. When the slot aperture 6 extends all the way to the end of the load carrier bar, the support member can be completely released and once again passed on to the load carrier bar. In order to efficiently prevent any possibility of the support member 3 turning around the centre of the connecting rod 7 and thus horizontally in relation to the load carrier bar in the load-receiving position, the support member is suitably provided with side portions 3a which project somewhat beyond the sides of the load carrier bar in this position, i.e. the position I.

The above-mentioned embodiment is only stated as an example and the details of the invention can be modified within the scope of the appended claims without departing from the basic idea of the invention. It is thus within the scope of the invention to let the support member abut directly against the underside of the load carrier bar or to manufacture the spring means 8 in a form different from the one shown in the drawings. As mentioned by way of introduction, the design and the fitting of the support member to the vehicle can, of course, vary within wide limits without departing from the idea of the invention.

What is claimed is:

1. A load carrier for vehicles, comprising: a load carrier bar (2) which extends over the exterior of a vehicle (1), and support members (3) which extend between the load carrier bar and the vehicle and which are releasably mountable on the vehicle, the support members being releasably mountable to the load carrier bar with the aid of clamping devices (7–10) which extend from each support member (3) for engagement with the load carrier bar, said support members (3) are pivotable in relation to the load carrier bar (2) and have a locking effect dependent on the pivot position of the support members adapted to keep the support member and the load carrier bar clamped together in a first pivot position (I), a load-carrying position, of the support member with the aid of the clamping means, and to minimize the clamping force produced by the clamping devices against the load carrier bar when pivoted to a second pivot position (III), a release position, allowing a displacement/adjustment of the position of the support member along the load carrier bar; the load carrier bar (2) is a tubular section which in its side facing the support member (3) is formed with a slot aperture (6) extending along the load carrier bar towards the inside thereof for operative engagement with said clamping means.

2. A load carrier according to claim 1, characterised in that the clamping devices has a connecting rod (7), which extends from the support member (3) through the slot aperture of the load carrier bar and which has an abutment part (8), which extends at the inside of the load carrier bar beyond the side edges of the slot aperture, said rod further being articulated to the support member, and the side of the support member facing the load carrier bar has a support surface (11) which is eccentric with a pivot (10) of the clamping devices in the support member and whose radial distance r from the pivot (10) of the support member is greater in the load-carrying position (1; $r^1$) than in the release position (III; $r^3$) concerning the support surface portion which is effective in the respective positions.

3. A load carrier according to claim 2, characterised in that between the portions of the support surface (11) which are effective in the release position (III) and the load-carrying position (I), respectively, there is a crest-forming transition portion with a greater radial distance ($r^2$) from the pivot (10) so that the load-carrying position and the release position are located each on one side of the crest position.

4. A load carrier according to claim 3, characterised in that the abutment part of the connecting rod in the load carrier bar includes a spring means (8) which acts between the connecting rod and the inside of the load carrier bar and which allows a limited pivoting of the load carrier bar in relation to the support member when deflecting.

5. A load carrier according to claim 4, characterised in that the clamping devices is adjusted in such manner that the spring means is substantially nontensioned in the release position (III) of the support member and tightly tensioned in the load-carrying position (I) with a limited remaining range of spring (c) which is set to correspond to a desired maximum deflection of the load carrier bar in relation to the support member (3).

6. A load carrier according to claim 2 characterised in that the connecting rod is screwed by means of a threaded portion into a pivot pin (10) which forms the pivot of the support member, whereby the pressure between the clamping means and the load carrier bar is adjustable by turning the connecting rod (7).

7. A load carrier according to claim 4, characterised in that the spring means (8) is provided with two legs (8a) which extend each on one side of the connecting rod in the longitudinal direction of the load carrier bar and which abut against the inside of the load carrier bar with their outer end portions (8a').

8. A load carrier according to claim 3, characterised in that the abutment part of the connecting rod in the load carrier bar includes a spring means (8) which acts between the connecting rod and the inside of the load carrier bar and which allows a limited pivoting of the load carrier bar in relation to the support member when deflecting.

9. A load carrier according to claim 3, characterized in that the connecting rod is screwed by means of a threaded portion into a pivot pin (10) which forms the pivot of the support member, whereby the pressure between the clamping means and the load carrier bar is adjustable by turning the connecting rod (7).

10. A load carrier according to claim 4, characterized in that the connecting rod is screwed by means of a threaded portion into a pivot pin (10) which forms the pivot of the support member, whereby the pressure between the clamping means and the load carrier bar is adjustable by turning the connecting rod (7).

11. A load carrier according to claim 5, characterized in that the connecting rod is screwed by means of a threaded portion into a pivot pin (10) which forms the pivot of the support member, whereby the pressure between the clamping means and the load carrier bar is adjustable by turning the connecting rod (7).

12. A load carrier according to claim 5, characterized in that the spring means (8) is provided with two legs (8a) which extend each on one side of the connecting rod in the longitudinal direction of the load carrier bar and which abut against the inside of the load carrier bar with their outer end portions (8a).

* * * * *